United States Patent [19]
Duffield et al.

[11] Patent Number: 5,398,074
[45] Date of Patent: Mar. 14, 1995

[54] PROGRAMMABLE PICTURE-OUTSIDE-PICTURE DISPLAY

[75] Inventors: David J. Duffield; Gene H. Johnson, both of Indianapolis, Ind.

[73] Assignee: Thomson Consumer Electronics, Inc., Indianapolis, Ind.

[21] Appl. No.: 272,960

[22] Filed: Jul. 11, 1994

Related U.S. Application Data

[63] Continuation of Ser. No. 980,812, Nov. 24, 1992.

[51] Int. Cl.⁶ .............................................. H04N 5/45
[52] U.S. Cl. .................................... 348/564; 348/569; 348/570; 348/734
[58] Field of Search ............... 348/913, 725, 731, 732, 348/734, 563, 564, 565, 566, 569, 570

[56] References Cited

U.S. PATENT DOCUMENTS

| | | | |
|---|---|---|---|
| 4,698,664 | 10/1987 | Nichols et al. | 358/10 |
| 4,984,082 | 1/1991 | Okamura | 358/183 |
| 5,040,067 | 8/1991 | Yamazaki | 358/183 |
| 5,130,800 | 7/1992 | Johnson et al. | 358/183 |
| 5,146,210 | 9/1992 | Heberle | 340/709 |
| 5,146,335 | 9/1992 | Kim et al. | 358/183 |

FOREIGN PATENT DOCUMENTS

| | | | |
|---|---|---|---|
| 0498526 | 8/1992 | European Pat. Off. | H04N 5/45 |
| 1639970 | 6/1991 | Japan | H04N 5/262 |
| 0162184 | 7/1991 | Japan | H04N 5/45 |
| 4-196691 | 7/1992 | Japan | H04N 5/46 |

OTHER PUBLICATIONS

Patent Abstracts of Japan, vol. 14, No. 241 (E-931) 22 May 1990, corresponding to JP A 20 65 575.
Patent Abstracts of Japan, vol. 11, No. 55 (E-481) 20 Feb. 1987, corresponding to JP A 61 214 872.
Patent Abstracts of Japan, vol. 12, No. 486 (E-695) 19 Dec. 1988, corresponding to JP A 63 200 681.

*Primary Examiner*—Victor R. Kostak
*Assistant Examiner*—Nathan J. Flynn
*Attorney, Agent, or Firm*—Joseph S. Tripoli; Joseph J. Laks; Harvey D. Fried

[57] ABSTRACT

A wide screen television apparatus comprises a memory for storing a set of video sources, a circuit for tuning to the set of video sources and a video signal processor. The video signal processor is coupled to the memory and to the tuning circuit, and develops a wide screen multiple picture display by selecting any one of the set of video sources for generating a main picture of the display and by selecting all of the set of video sources for generating supplemental pictures of the display, for example as three POP's. A remote control can be activated for choosing the set of video sources and for selecting the main picture from among the supplemental pictures. The multiple picture display is modified in a manner which identifies which one of the supplemental pictures corresponds to the main picture. An on-screen display indicator can be generated for the supplemental picture corresponding to the main picture. In an alternative, the supplemental picture corresponding to the main picture can be repositioned on the display. In another alternative, the supplemental picture corresponding to the main picture can be modified in appearance.

13 Claims, 4 Drawing Sheets

PROGRAMMABLE PICTURE-OUTSIDE-PICTURE DISPLAY

This is a continuation of application Ser. No. 07/980,812, filed on Nov. 24, 1992.

BACKGROUND OF THE INVENTION

1. Field of the Invention

This invention relates generally to the field of multiple channel selection and picture display in a wide screen television, wherein a main video picture and a plurality of secondary video pictures can be displayed as POP's, and more particularly, wherein the secondary pictures can represent a viewer selected set of available video pictures from which the main picture can be frequently and/or continuously selected and reselected by the viewer without having to reidentify channel numbers or the like. This facilitates quick and convenient monitoring of a plurality of signals such as sporting events, soap operas, newscasts or the like, in which the most interesting action of simultaneously broadcast is programs may occur in the different programs at different times.

2. Description of Art

With the advent of wide screen televisions, many new features are made possible. A wide screen television may have a format display ratio, for example, of 16 horizontal units and 9 vertical units, as opposed to the traditional television display ratio of 4×3. One feature made available by the wide screen display ratio is the POP, or picture-outside-picture feature. POP involves the display of one or more smaller video images in an otherwise unused side area of the 16×9 display area, simultaneously with display of a larger 4×3 image.

The main 4×3 image, from a first source, is arranged to the available vertical space. By placing the main 4×3 image at one lateral side of the display area, sufficient space is opened along the opposite side for up to three more images, each having a 4×3 display ratio and being one third of the size of the main 4×3 image. It is also possible to use other specific ratios and display arrangements; however, by making the three smaller images one third of the size of the larger one, no cropping, uneven compression or other distortion is needed for any of the images contained in the first (main) source signal, or in the images contained in the signals from second through fourth sources, used for the pictures outside of the main picture. Presently available products allow either one channel to be strobed through the three extra POP windows, or for the extra windows to be used to display images from the sequential tuning of channels in a scan list.

A wide screen television apparatus with POP capabilities is known from WO/19388, published Dec. 12, 1992, corresponding to International patent application PCT/US91/03740, filed May 29, 1991. The television apparatus a one chip video processor and two tuners. A wide screen processor controls the use of the display for the main picture, decoded using one of the tuners, and one or more supplemental POP's (or PIP's, i.e. picture-in-pictures), decoded using the other tuner. Where a plurality of supplemental pictures are provided, the second tuner sequentially selects one of the required frequencies and the wide screen processor grabs an image. The display is then driven to present the main image and the most recently captured frame(s) of the supplemental image(s). Although the device operates continuously to update the images, due to the sharing of the second tuner the supplemental pictures are necessarily updated at less than their video rate. The wide screen processor resolves any differences in synchronization between the images.

A system of this type, for cycling through channels in several small images, is also described in the publication entitled The CTC 140 Picture in Picture (CPIP) Technical Training Manual, available from Thomson Consumer Electronics, Inc., Indianapolis, Ind.

SUMMARY OF THE INVENTION

The utility of a multiple image display system could be improved if the viewer were allowed to control the presentation of the small images. In particular, it would be desirable to enable the viewer to select the number of small pictures and the source of the small pictures. If the viewer has the capability to change the number of small images, he or she can control the rate at which the small pictures are updated, as well as the resolution at which they are displayed. When the number of channels to be scanned is smaller, each can be refreshed more often using a system which successively cycles through the channels. If only one small image is used, or if two small images are used but one is provided from a baseband input, the second tuner can remain on one selected frequency and the sources can be switched back and forth using video switches. This arrangement permits very fast updating of the small images, e.g., up to 15 frames per second.

Displaying a main picture and two small pictures, instead of the three small pictures at one third size as presently known, requires some cropping or squeezing to arrange the images in the available 16×9 space. However, the amount of cropping or the like is not great (11%), and each of the main picture and two supplemental pictures appears to be moving at full speed.

It is an aspect of the invention that the selection and display of small pictures is facilitated to enable the viewer to rapidly choose channels to be displayed in the small pictures, and also to select one of the channels for display as the main picture. This can be accomplished in conjunction with a simple input such as the up/down control button of a remote controller. The display is arranged visibly to indicate one of a plurality of supplemental channels, for example using a cursor, highlighting, framing or a similar indicator.

A wide screen television apparatus according to an inventive arrangement comprises a memory for storing a set of video sources, a circuit for tuning to the set of video sources and a video signal processor. The video signal processor is coupled to the memory and to the tuning circuit, and develops a wide screen multiple picture display by selecting any one of the set of video sources for generating a main picture of the display and by selecting all of the set of video sources for generating supplemental pictures of the display, for example as three POP's. A remote control can be activated for choosing the set of video sources and for selecting the main picture from among the supplemental pictures. The multiple picture display is modified in a manner which identifies which one of the supplemental pictures corresponds to the main picture. An on-screen display indicator can be generated for the supplemental picture corresponding to the main picture. In an alternative, the supplemental picture corresponding to the main picture can be repositioned on the display. In another alternative, the supplemental picture corresponding to the main picture can be modified in appearance. A viewer can monitor a number of programs and select for main viewing the most interesting program in a quick and convenient manner.

The capability to display, indicate and conveniently select among supplemental pictures dramatically improves the usefulness of a POP or PIP feature in a television apparatus. If a viewer wishes to monitor a plurality of channels where the most interesting action occurs on different channels at different times, such as sporting events occurring simultaneously on three different channels, the viewer can program the television to display those channels in the smaller pictures. One of the three smaller pictures can always be displayed as the main picture and is identified visibly as the selected one in that smaller picture. Using the remote control, the viewer can readily switch between the selections to choose the main display.

DETAILED DESCRIPTION OF THE PREFERRED EMBODIMENTS

Figure 1:
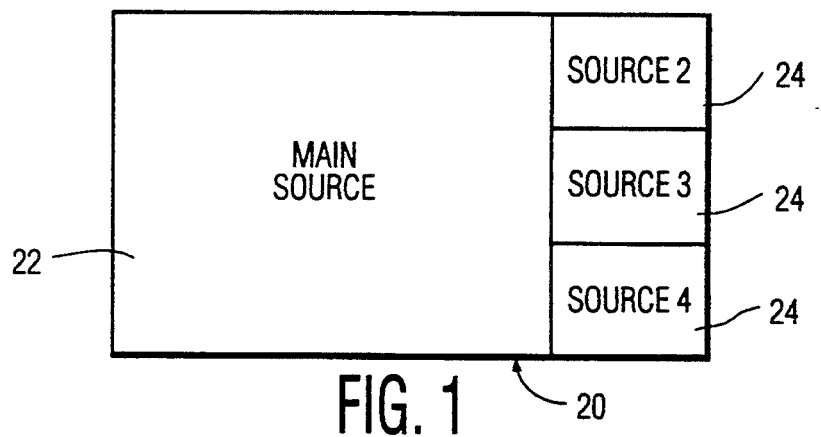
FIGS. 1 and 2 are illustrations of alternative picture-outside-picture display presentations on a 16×9 display area, having a main picture and three smaller pictures.

Referring to FIG. 1, a 16×9 wide screen display format 20 is shown wherein one large 4×3 format display ratio picture 22 and three smaller 4×3 format display ratio pictures 24 are displayed simultaneously. The wide screen can be part of a direct view or projection television apparatus. A smaller picture outside the perimeter of the large picture is referred to as a POP, that is, a picture-outside-picture, as opposed to a PIP, a picture-in-picture. In those circumstances where the wide screen television is provided with two tuners, either both internal or one internal and one external, for example in a video cassette recorder, two of the displayed pictures can display movement in real time in accordance with the source. The remaining pictures can be displayed in freeze frame format or the like. It will be appreciated that the addition of further tuners and additional auxiliary signal processing paths can provide for more than two moving pictures. It will also be appreciated that the large picture 22 on the one hand, and the three small pictures 24 on the other hand, can be switched in position, as shown in FIG. 2.

Figure 2:
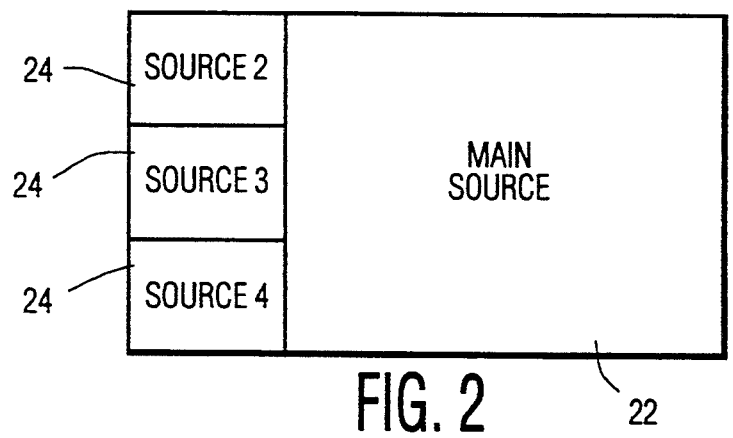

The manner in which a presentation as shown in FIGS. 1 and 2 can be produced is known form WO/19388, published Dec. 12, 1991, corresponding to international application PCT/US91/03740, filed May 29, 1991. Two tuners and two processors manage the capture and storage of pixel data which is arranged in the desired display format and read out via a CRT or other display. A signal processor generates first and second video signals from input video signals and a switching circuit selectively couples video signal sources as the input video signals. The signal processor can manipulate data from the input video signals by selective interpolation and cropping. A synchronizing circuit synchronizes the first and second signal processors with a mapping circuit and a selecting circuit selects as an output video signal one of the first and second processed video signals and combinations of the first and second processed video signals.

For simultaneous display of a plurality of pictures wherein at least one of the pictures is updated at full speed, at least two tuners are used. One tuner is devoted to the main signal and the other tuner is sequentially tuned to the supplemental channels, in turn grabbing a frame from each of the supplemental channels which are selected by the viewer. It would also be possible to use additional tuners so that the supplemental channels could be updated at full speed.

Figure 3:
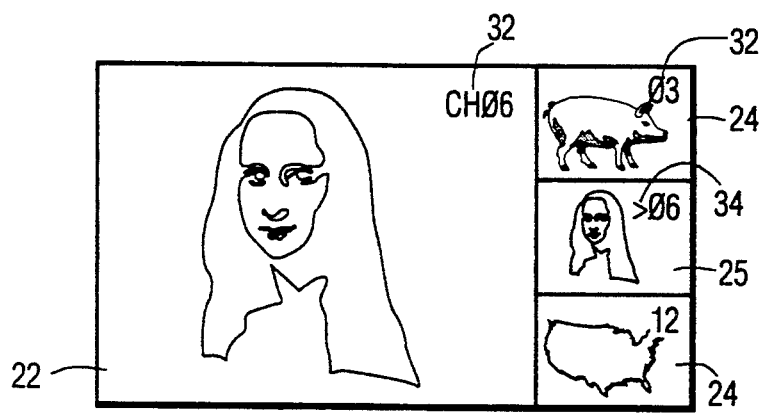
FIG. 3 shows a POP display arrangement according to the invention, wherein the main picture is selected from one of three POP's, and is indicated on the corresponding POP.

In FIG. 3, the main and supplemental channels are displayed simultaneously, with the main picture 22 corresponding to one of the POP areas 24. The viewer enters a list of channel selections, for example using a remote controller in response to on-screen menu prompts, then selects which of the selections in the list is to be displayed as the main channel. Alternatively, the menu prompts may enable the selection of channel numbers from a scrollable list indicated, for example, by highlighting. As a further alternative, a plurality of channels, for example twelve, may be shown in freeze frame in a channel guide display. The viewer can then select POP sources by manipulating an on-screen selector, in a manner similar to those described in detail below in connection with FIGS. 3–7 and procedures for choosing a main picture from the available POP's. The viewer's selection for the main channel is visibly indicated in the POP area 25 corresponding to the main channel. The viewer can also control the number of POP's to be displayed, according to the number of channels selected.

In FIG. 3, the channel numbers 32 are shown and the selected one of the channels from the list for use as the main channel is identified by an extra mark character 34, which in the illustrated example defines a pointer ">". There are a number of alternatives for showing the channel numbers and for identifying the selected channel. In this case, the on-screen character generator of the television is arranged simply to add the marking character to the displayed channel number. The channel numbers 32 for the main and/or supplemental channels can remain on, can be switchable between momentary-display and persistent modes, or can be displayed briefly in the event of a channel change, change of selected channel, operation of the remote for any reason, etc.

Figure 4:
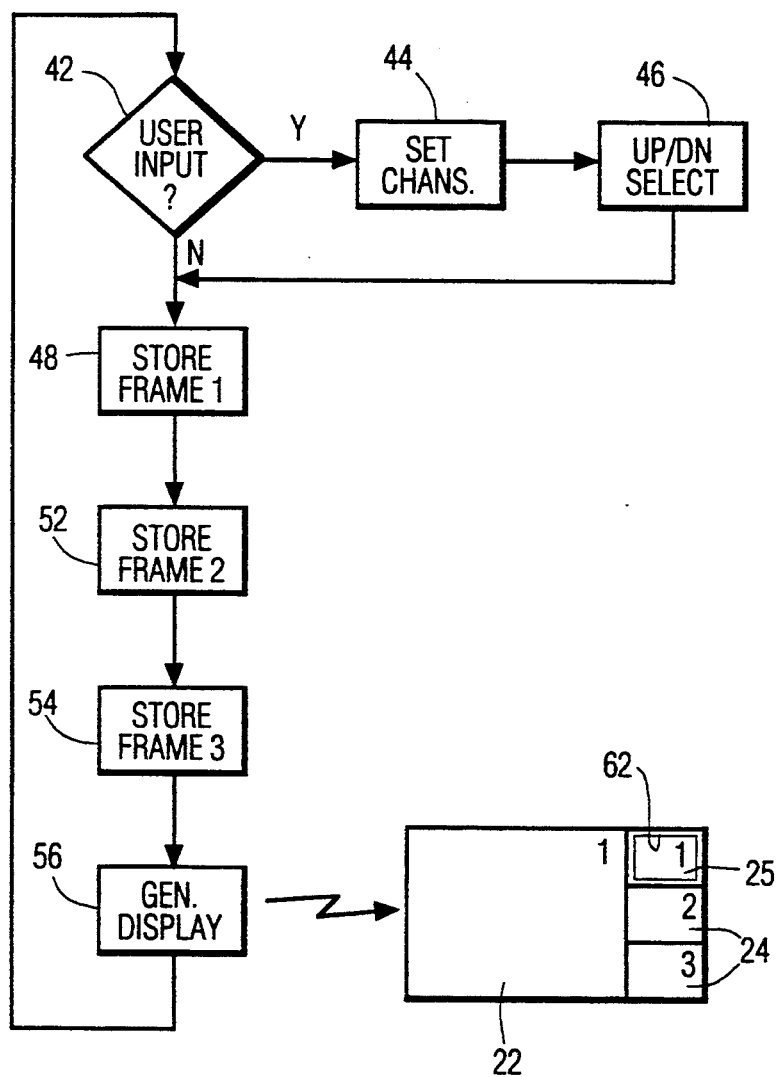
FIG. 4 is a flow chart showing processing steps for selection and display of a selected channel.

The channel selection and frame grabbing aspects of the television can operate in a cyclic loop as shown in FIG. 4. Before storing a next frame of information for the main and supplemental channels, a decision branch 42 is encountered based on whether new data has been received from the remote control. In the event of viewer input from the remote control, new channel selections are entered into the channel list at block 44, or a different one of the listed channels is selected for viewing as the main channel at block 46. The viewer input can be a number from a keypad on the remote, for setting the channels or selected channel. However, the display feature of the invention is most easily used when the channel selection is embodied as a simple one or two button viewer input such as the up/down control on the remote control allow the viewer to switch from one of the supplemental channels in the list to the next, with one stroke. Up/down controls (e.g., ±, ∧/∨) on remote control devices are marked with a variety of symbols and are sometimes separate switches and sometimes rocker switches.

The channel selection list is used to determine the frequencies on which the tuner(s) are to be locked. Typically the tuner includes a phase locked loop that is locked to a frequency defined by a digital signal from the control processor, e.g., a one chip processor. The main channel frequency can be set at one of two tuners and the supplemental channel frequencies can be sequentially set at a second tuner, which locks to the supplemental channels one at a time. As a result, the refresh rate of the supplemental channels is less than their frame rates. Whereas the main channel is obtained from one tuner, the second tuner need only cycle through the other channels in the channel list.

The main channel frame is stored at block 48 in FIG. 4, and the two remaining channels in the list are stored at blocks 52 and 54. FIG. 4 shows the frame storage blocks as sequential operations; however, the timing is such that the main channel is processed more or less in parallel with the remaining channels in the list.

Having obtained stored frames for the three channels, the display is generated at block 56, and the cycling continues. Generation of the display can involve reading pixel data from RAM, and converting the pixel data into RGB or YUV analog signals at the horizontal scanning rate of the display. Whereas the main signal is read out full size in main window, and the main and supplemental channels are read out at one third size for the side windows, the channel data for those channels which are not selected as the main channel can be stored using a lower pixel resolution than for the main channel. Alternatively, the pixel resolution can be the same as stored, but the data for channels other than the main channel (as well as the small version of the main channel appearing in side window) can be sampled, interpolated, cropped or otherwise compressed for display in the proper size and position on the screen.

A visible indication of which of the smaller pictures has been selected as the main channel is preferred, together with a simple up/down control switch for changing the selected main channel from one of the channels in the list to the next. These two features enable the viewer to switch readily between the channels whenever the most interesting action appears in a channel other than the main channel, effectively monitoring all three channels at once. This feature is especially useful for fans of sporting events, soap operas and newscasts, for example, since it is frequently the case that two or more such events are televised at the same time. In FIG. 4, the selected channel 25 is visibly distinguished from the other channels by an extra border line 62 in the small image.

Figure 5:
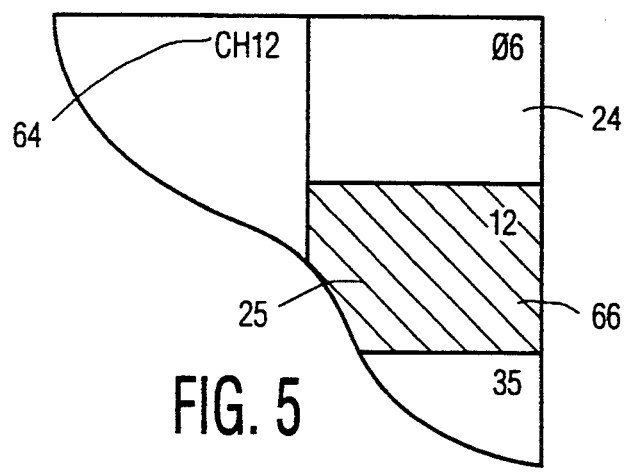
FIGS. 5 through 7 show exemplary POP indicating formats according to the invention.
Figure 6:
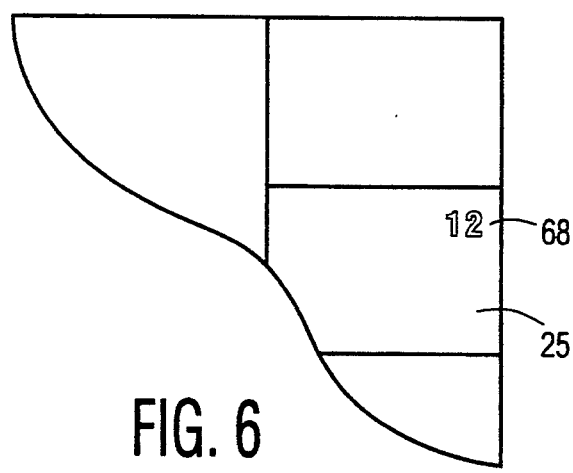
Figure 7:
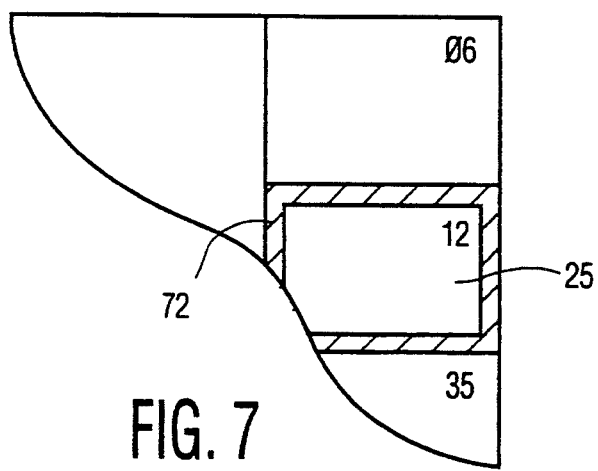

FIGS. 5-7 illustrate other methods for providing a visible indication of the selected channel 25. In FIG. 5, on-screen indicators 32 are provided to identify the channel number of the main screen 22, and each of the smaller screens 24. To distinguish the selected smaller screen 25 from the others, the image 66 displayed on the selected smaller screen is altered, for example in luminance, saturation and/or hue, so as to readily identified. For example, the selected channel can be darker than the corresponding image on the main screen, or if desired, blanked entirely.

In FIG. 3, the on-screen characters 32 identifying the channel were supplemented by a marking character 34 to show the selected channel 25. The marking character can be used alone (i.e., without a channel number) or the persistence of the channel number on the selected small screen can be different than that for others. As shown in FIG. 6, if only the selected screen has an on-screen channel number, the selected channel is clearly identified. As also illustrated in FIG. 6, the form of the on-screen channel number can identify the selected channel. For example, the on-screen character 68 can be larger or of a distinct font or shape, and/or the color or brightness of the on-screen character can be distinct from the other channels. In FIG. 6 the non-selected channels can also display channel numbers, for example for a few seconds following a change in the channel selection list or a change in the selection of the main channel from the list.

In FIG. 7, the selected channel 25 is identified by a distinct border design 72. For example, a darker or lighter border, a colored border or a thicker border can distinguish the selected channel from the others. As another possibility, the placement of the supplemental channels can be made to indicate the selected one. For example, the selected main channel can be displayed always in the center smaller block as in FIG. 7, and when a different main channel is selected (e.g., by use of an up or down signal from the remote control), the supplemental channels can be rearranged in position such that the new selected channel appears in the middle and the former selected channel is moved to the top or bottom, etc.

It will be appreciated that there are various additional ways in which the selected channel can be visibly distinguished, and the foregoing particular examples are not intended to limit the invention to particular forms for visibly distinguishing the selected channel from the others.

Figure 8:
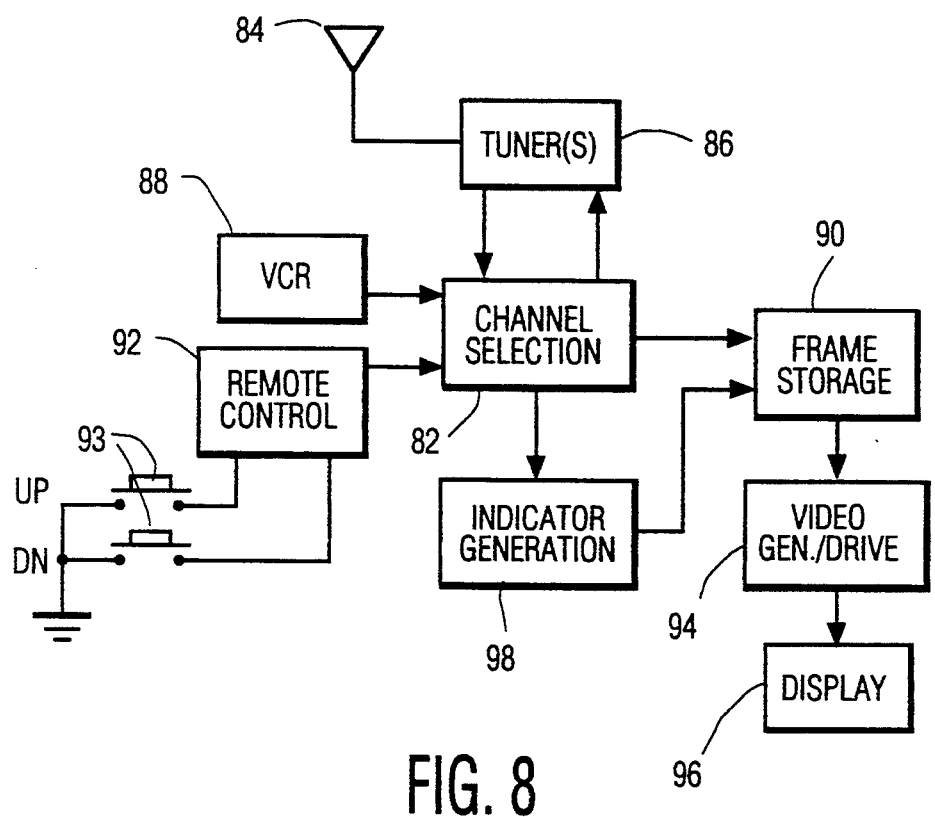
FIG. 8 is a schematic block diagram showing the functional elements of the invention.

FIG. 8 is a schematic diagram illustrating one possible arrangement for signal flow between the functional elements of the invention. The grouping of the functions into specific blocks does not exclude the possibility that these functions will be contained in the same circuits or processors. In FIG. 8, a channel selection circuit 82 is coupled to a plurality of video sources, for example frequency division multiplexed signals received over the air on an antenna 84. Under control of the channel selection circuit, one or more tuners 86 extracts one or more of the channel signals. The available channels may come from diverse other sources as well. For example, a baseband signal may be available from a VCR 88 or the like, and also be available to the channel selection circuit 82. In any event, at least two signals are derived from the available inputs, and preferably three, the channel selection circuit 82 being operable to select from the plurality of video sources at least one main channel and at least one supplemental channel.

The video data from the signals is stored in a frame storage means 90. The channel selector 82 is also coupled to a viewer input 92 for changing which of the plurality of video sources will be the main channel, and which will be displayed on the smaller POP windows only. The viewer input device can be a remote control having up/down switches 93, and can also be used to add, remove or change channel numbers in a stored list of channels which are to be captured by the channel selection circuit 82.

The stored video frame data is passed to a video decoding and driving means 94 coupled to the channel selector 82 and to a wide screen display 96. The video decoding and driving means 94 is operable to present the selected main channel and supplemental is channel substantially simultaneously on the display 96, at different areas and normally in a manner that displays the main channel 22 substantially completely and full size. The supplemental channels 24 can be smaller, and can be updated less frequently than the full video rate which is available from the respective source.

An indicator generator 98 is coupled to the channel selector 82 and to the video decoding and driving means 94. The indicator generator 98 is operable to produce a visible indication 34, 62 on the display for identifying at least one of the selected main channel and supplemental channel from a plurality of potential selections available from the channel selector 82. In the embodiments described above, all the available channels from a list of three channels are displayed on the smaller POP's, and the main channel is displayed redundantly in the larger main display area.

The indicator generator 82 is operable to identify a selected one of the supplemental channels for display as the main channel by use of a distinct on-screen presentation of the respective image 24 or its channel number 32. The channel number may be distinct as to presentation, persistent or momentary presentation, shape, size, font, additional cursor marker or the like. The image itself may be presented distinctly, for example using an identifiable frame element and/or a variation of one or more of luminance, saturation and hue, for distinguishing the main channel from among the supplemental channels in the smaller POP windows 24.

The invention is particularly applicable to a wide screen display with at least three POP's displayed laterally to one side of the main picture. For example, the display can be a 16×9 format display ratio with the main and supplemental channels arranged for a 4×3 format picture. The main channel fills the screen vertically, and three one-third size supplemental channel POP's are displayed at a lateral side of the display.

What is claimed is:

1. A television apparatus, comprising:
   means for storing a set of signals corresponding to a set of video sources;
   video signal processing means, coupled to said storing means, for developing a multiple picture display by using one of said signals to select one of said video sources from said set of video sources to generate a main picture of said display and by using all of said signals to corresponding to said set of video sources to generate supplemental pictures of said display, smaller in size than said main picture, said multiple picture display having an on-screen indication identifying which one of said supplemental pictures corresponds to said main picture; and,
   control means responsive to viewer activation for choosing said set of video sources and for automatically selecting said main picture from among said supplemental pictures responsive to repositioning of said on-screen indication.

2. The television apparatus according to claim 1, wherein said multiple picture display comprises three of said supplemental pictures, disposed laterally to one side of said main picture.

3. The television apparatus according to claim 1, wherein said multiple picture display is a wide screen display and comprises three of said supplemental pictures.

4. The television apparatus according to claim 1, wherein said multiple picture display has a 16×9 format display ratio and said main picture and each of said supplemental pictures has a 4×3 format display ratio.

5. The television apparatus according to claim 1, wherein said on-screen display indication is persistent.

6. The television apparatus according to claim 1, wherein said on-screen display indication is a channel indicator.

7. The television apparatus according to claim 1, wherein said on-screen display indication is a cursor.

8. The television apparatus according to claim 1, wherein said on-screen display indication is picture frame.

9. The television apparatus according to claim 1, wherein said on-screen display indication is the position on said display of said one of said supplemental pictures corresponding to said main picture.

10. The television apparatus according to claim 1, wherein said on-screen display indication is a modification of said supplemental picture corresponding to said main picture, relative to said other supplemental pictures, by at least one of luminance, saturation and hue.

11. The television apparatus according to claim 1, wherein said control means requires actuation of only one switch in a remote control device for both repositioning said on-screen display and initiating said automatic selection of said main picture.

12. The television apparatus of claim 1, wherein said main picture and one of said supplemental pictures are generated from the same video source.

13. A television apparatus, comprising:
   means for storing a set of signals corresponding to a set of video sources;
   video signal processing means, coupled to said storing means, for developing a multiple picture display on a video display means having a wide format display ratio, by using one of said signals to select one of said video sources from said set of video sources to generate a main picture of said display and by using all of said signals to corresponding to said set of video sources to generate supplemental pictures of said display, smaller in size than said main picture, said multiple picture display having an on-screen indication identifying which one of said supplemental pictures corresponds to said main picture; and,
   control means responsive to viewer activation for choosing said set of video sources and for automatically selecting said main picture from among said supplemental pictures responsive to repositioning of said on-screen indication.

* * * * *